June 10, 1958 H. M. HEUVER ET AL 2,838,240
DEVICE FOR SUPERIMPOSING DIGIT COUNTS IN THE MECHANICAL COUNTERS
Filed Sept. 21, 1955 2 Sheets-Sheet 1

INVENTORS
HERBERT M. HEUVER
JOHN B. D'ANDREA
BY Wade Koontz and Julius L. Rubinstein
ATTORNEYS June 10, 1958 H. M. HEUVER ET AL 2,838,240

DEVICE FOR SUPERIMPOSING DIGIT COUNTS IN THE MECHANICAL COUNTERS

Filed Sept. 21, 1955

2 Sheets-Sheet 2

INVENTORS
HERBERT M. HEUVER
JOHN B. D'ANDREA
BY Wade Koontz
Julius Louis Rubinstein
ATTORNEYS 2,838,240

DEVICE FOR SUPERIMPOSING DIGIT COUNTS IN THE MECHANICAL COUNTERS

Herbert M. Heuver and John B. D'Andrea, Dayton, Ohio

Application September 21, 1955, Serial No. 535,766
5 Claims. (Cl. 235—136)
(Granted under Title 35, U. S. Code (1952), sec. 266)

The invention described herein may be manufactured and used by or for the United States Government for governmental purposes without payment to us of any royalty thereon.

This invention relates to a digital converter and more particularly to a device for imposing digit counts on digit members of any order in a digital converter.

Digital converters or counters are widely used for storing and recording information. The difference between them being that digital counters are usually designed to produce a visual indication of the input to the machine, whereas a digital converter is designed to convert an input into an electrical equivalent.

The invention in this case is applicable either to digital converters or counters. In essence this invention provides a means for superimposing counts on a conventional digital converter. With it, counts can be added or subtracted at any decimal place. This device is particularly adapted to be used with the digital converter covered by pending application 317,376, now Patent No. 2,733,008. Digital converters previously in use have suffered from a certain inflexibility. With a digital superimposer combined with a digital converter, it is possible to conveniently record the number of times the input to the converter reached any arbitrary value, or to produce a nonlinear output from the converter from a linear input. These added functions vastly increase the uses to which digital converters can be put.

A principal object of this invention is to combine a device with a digital converter adapted to superimpose counts at any decimal place in the converter.

A further object of this invention is to design a device for superimposing counts in a digital converter that does not interfere with the operation of the converter until superimposition is required.

Other objects of this invention and many of the attendant advantages will be readily appreciated as it becomes better understood by reference to the following detailed description when taken in conjunction with the accompanying drawings.

Figures 2, 3:
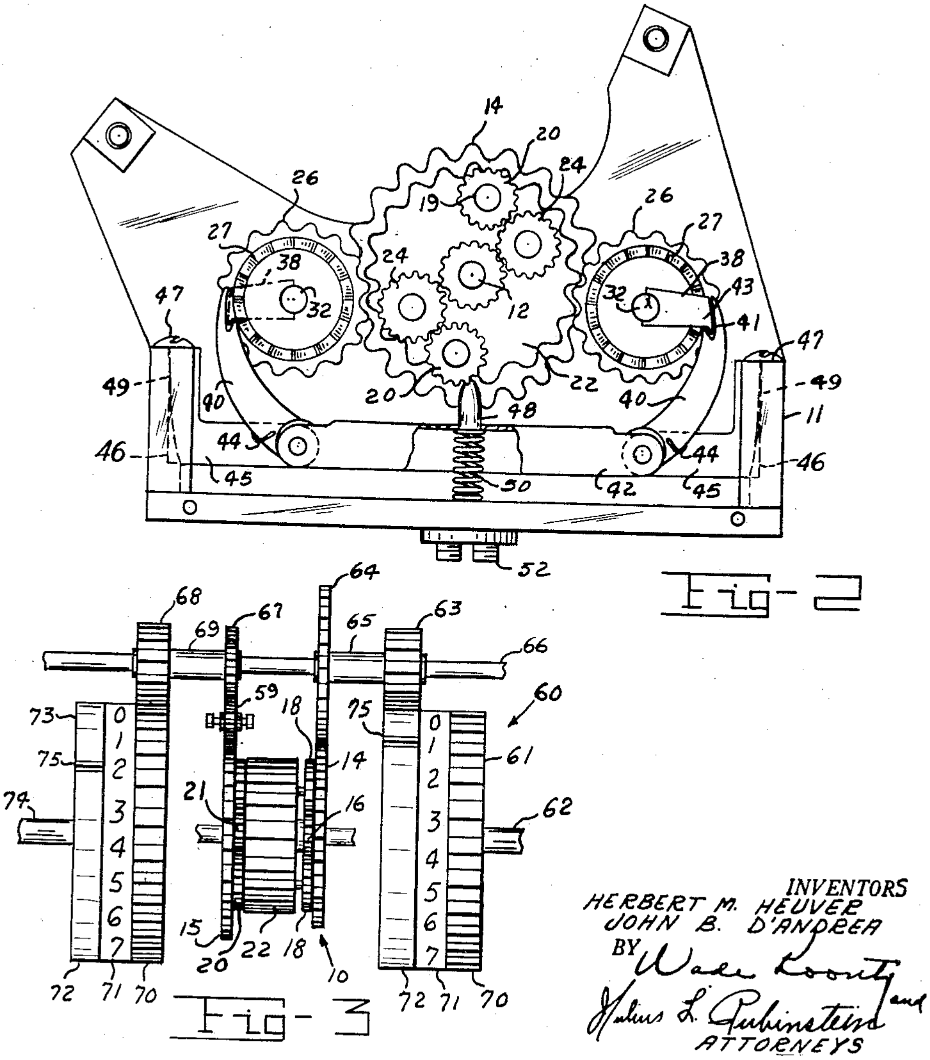
Fig. 2 is a side view of the digital superimposer with a portion of the frame work, and the rotary solenoids with their clutch member removed for better visibility.

Fig. 3 discloses a portion of a typical converter or counter in combination with a portion of the digital superimposer unit. The means for actuating the digital superimposer are removed for greater clarity.

Figure 4:
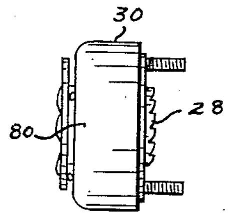

Fig. 4 discloses an end view of one of the rotary solenoids which drives the gear trains.

Figure 5:
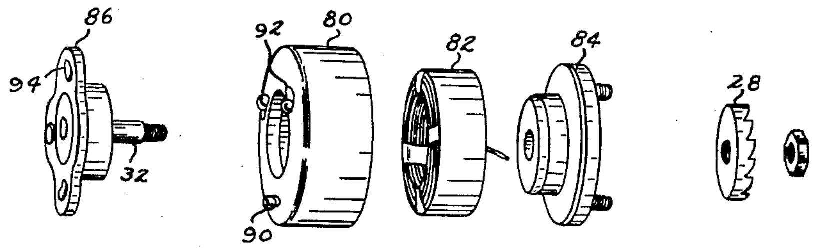

Fig. 5 is an exploded perspective view of a rotary solenoid.

Referring now to the drawing and more particularly to Fig. 3, a portion of the digital counter or converter designated generally at 60 comprises an input shaft 62 driving a digit member or wheel 61. Member 61 need not be in wheel form for the purposes of this invention and for that reason is referred to as a digit member. The periphery of this digit wheel is divided into three sections. Portion 70 has gear teeth uniformly disposed around the periphery of the digit wheel. Portion 71 has indicia uniformly disposed around the periphery. Portion 72 has only one gear tooth 75. This tooth is designed to mesh with the teeth in transfer gear 63 rotatably mounted on support shaft 66. As can be seen, one complete revolution of digit member 61 causes tooth 75 to engage gear 63 and rotate that gear a distance equal to one gear tooth. Without the digital superimposer feature installed in the converter, gear 63 would be integrally attached to gear 68 which meshes with the geared portion 70 of the next higher order digit wheel 73. If that were so, it can be seen that a complete revolution of digit member 61 could be made to rotate digit member 73 a distance equivalent to one digit or one count. In this invention transfer gear 63 is no longer rigidly connected to transfer gear 68. To provide a means for permitting the digital converter 60 to operate normally when digital superposition is not required, gear 63 is rigidly secured to gear 64. Both gears are mounted on a common hub 65 which is rotatably mounted on support bar 66. Gear 64 meshes with gear 14 of the digital superimposer unit 10. This motion is transmitted through a differential gearing to gear 15 in the superimposer 10. Gear 15 meshes with an idler gear 59 which in turn meshes with gear 67 which is rigidly connected to gear 68. Gears 67 and 68 are mounted on a common hub 69 rotatably mounted on support bar 66. Gear 68 meshes with the gear teeth in geared portion 70 of the next higher order digit member 73. As seen in Fig. 3 gear 15 does not mesh directly with the next higher order digit member 73, but operates on it through intermediate gears 59, 67 and 68. It is obvious that gear 15 could mesh directly with digit member 73 by shifting the position of the digit member. Since the purpose of gears 59, 67 and 68 is only to maintain the digit members in axial alignment, these gears will be considered as part of the digit member. Hence gear 15 will be referred to as meshing directly with the digit member selected to receive the superimposed counts. It is also obvious that a transfer gear aligning means is necessary to maintain the digit members in their proper relationship, but since the aligning means plays no part in the present invention they have been omitted from Fig. 3 in the interest of clarity. The gear ratios in the digital converter and the digital superimposer are chosen in such a way that when gear tooth 75 meshes with gear 63, gear 68 rotates digit member 73 a distance equivalent to one count or digit. Thus it can be seen that with the superimposer attached to an ordinary digital converter or counter there is no interference with its normal operation.

Figure 1:
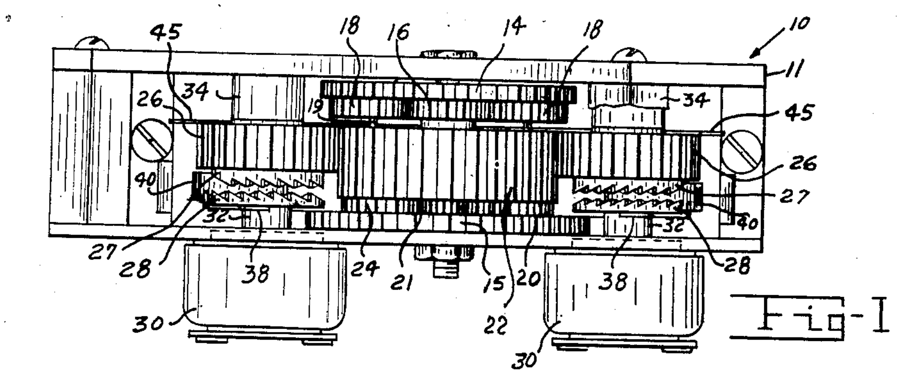
Fig. 1 is a top view of the digital superimposer unit before it is attached to a digital converter.

Referring now to Fig. 1, the digital superimposer unit indicated generally at 10 comprises a differential gear system mounted on a support frame 11. A first gear 14 is rotatably mounted on a shaft 12 journaled in frame 11. Gear 14 is designed to mesh with transfer gear 64. A second gear 15 rotatably mounted on support shaft 12 is designed to mesh with gears directly connected to the digit member 73 selected to receive the superimposed count. An intermediate differential system connects gear 14 to gear 15 in a 1:1 correspondence in such a way that a rotational one-tooth advance of gear 14 results in a rotational one-tooth advance of gear 15.

The intermediate gearing comprises a planetary spider gear 22 rotatably mounted on shaft 12. On one surface of planetary spider gear 22 a pair of first planetary gears 18 are mounted on shafts 19 extending through and rotatably journaled in the planetary spider gear 22. These shafts are parallel to and equidistant from the axis of the planetary spider gear on a common diameter. Planetary gears 18 mesh with pinion gear 16 integrally secured to and coaxial with the first gear 14. A pair of identical second planetary gears 20 are also rigidly mounted on shafts 19 on the opposite surface of the planetary spider gear 22 so that planetary gears 18 and 20 rotate together. Second planetary gears 20 mesh with a pair of planetary idler gears 24 rigidly mounted on other shafts rotatably journaled in planetary spider gear 22. These shafts are also equidistant from the axis of rotation of planetary spider gear 22 and are on a common diameter. Planetary idler gears 24 are positioned to mesh with pinion 21 integrally secured to and coaxial with second gear member 15.

A pair of driving gears 26 rotate on shafts mounted in bearing 34 secured to frame 11. As seen in Fig. 2 gears 26 are positioned on opposite sides of planetary spider gear 22 and mesh with that gear to provide means for rotating gear 22 in either direction. Integrally connected with driving gears 26 are ratchet clutch members 27. These clutch members are adapted to be engaged by ratchet clutch members 28 integrally secured to shafts 32. These shafts are driven by a pair of driving rotary solenoids 30 mounted in frame 11 (see Fig. 1). When a rotary solenoid is actuated, shaft 32 and ratchet clutch member 28 rotatably advance into engagement with ratchet member 27. The rotation of ratchet member 27 drives gears 26 which in turn drive planetary spider gear 22. As can be seen from an inspection of Fig. 2 the rotational sense of gear 22 depends on which solenoid is actuated.

The rotary solenoids 30 employed to rotate the driving gear are of standard construction. Typically, they comprise (see Figs. 4 and 5) an annular housing or casing 80. An annular electromagnetic coil 82 is rigidly mounted in and is concentric with casing 80 and is held there by a base member 84. An armature plate 86 is movably mounted on the opposite side of the casing 80. This armature plate has an integral shaft 32 which is concentric with the casing and the electromagnetic coil. Stainless steel balls 90 are mounted to ride in arcuate inclined races 92 in the surface of the casing 80 opposite the base member 84. These balls also ride in complementary shaped recess 94 in the armature plate. Accordingly, when the electromagnetic coil 82 is energized, the armature is drawn toward it. The cam action of the inclined races causes the armature 86 and shaft 32 to adapt a rotary motion. This rotary motion can be utilized to drive gear trains.

A detent member 48 mounted on support bar 42 is held in spring pressed locking engagement with the teeth of planetary spider gear 22 by means of a spring 50. One end of spring 50 engages the detent and support bar while the opposite end engages the adjusting screw 52 mounted in a recess in frame 11. Guide members 45 are secured to the ends of support bar 42. These guide members have arcuate ends 49 which slide in grooves 46 in train 11 and are held there by bolts 47 (see Fig. 2). These arcuate ends 49 permit the support bar 42 to pivot in grooves 46 as well as ride in them. Pivotally mounted on the ends of support bar 42 are pawls 40. The opposite ends of pawl 40 are recessed at 41 to receive an end 43 of dog 38 rigidly secured to shaft 32. A coil spring 44 is coaxial with the pivot of pawl 40, one end of the spring engages pawl 40 while the other end engages guide member 45 and maintains the recessed end 41 of pawl 40 in spring pressed engagement with the dog. With this arrangement the support bar and detent are maintained in position with respect to the gear 22.

When a rotary solenoid is actuated, shafts 32 and ratchet member 28 rotatably advance into engagement with ratchet member 27. This movement is in two steps. First the rotative advance rotates dog 38 which is in engagement with pawl 40. This movement rotates support bar 42 on arcuate ends of one of the guide members and forces the support bar 42 and detent member 48 out of locking engagement with the teeth of planetary spider gear 22. A further rotative advance of shaft 32 and ratchet member 28 brings the ratchet member into engagement with ratchet clutch member 27. This causes gear 26 to rotate and drive the planetary spider gear 22. A continued rotation of shaft 32 rotates dog 38 and further pivots support bar 42 around the arcuate end 49 of the opposite guide member 45 so that the dog becomes disengaged from pawl 40. This allows spring 50 to move the support bar 42 and detent member 48 into locking engagement with the next tooth of planetary spider gear 22 restoring support bar 42 and pawl 40 to a position adapted to receive the end of dog 38 on the return stroke of rotary solenoid 30.

This rotational one-tooth movement of the planetary spider gear is transmitted to the pinion gear 21 and second gear 15 independently of first gear 14 and transfer gears 63 and 64 of the digital counter. The gears are designed so that one gear tooth movement of gear 22 acting through gears 15, 67 and 68 moves digit member 73 a distance equivalent to one count or one digit. By actuating one or the other of the solenoids, counts can be added or subtracted without affecting the normal operation of the digital converter.

Obviously many modifications and variations of the present structure are possible in the light of the above teachings. It is, therefore, to be understood that the invention may be practiced in other ways than as specifically described and still remain within the scope of the appended claims.

What is claimed is:

1. An apparatus of the class described comprising a digital converter in combination with a digital superimposer, said digital converter comprising a plurality of digit members of various orders, said digit members interconnected by transfer means in such a way that the output of one digit member drives a transfer means which in turn drives a digit member of the next higher order, said digital superimposer comprising a first means connected to the transfer means adapted to drive the digit member selected to receive the superimposed counts, a second means connected to the digit member selected to receive the superimposed counts, intermediate means connecting said first means to said second means so that they move in a 1:1 correspondence to permit the digital converter to function normally when digital superposition is not required, means operative on said intermediate means adapted to actuate said second means independently of said first means when digital superposition is required.

2. An apparatus of the class described comprising a digital converter in combination with a digital superimposer, said digital converter comprising a plurality of digit members of various orders, said digit members interconnected by transfer means in such a way that the output of one digit member drives a transfer means which in turn drives a digit member of the next higher order, said digital superimposer comprising a first means connected to a transfer means for the digit member selected to receive the superimposed counts, a second means connected to the digit member selected to receive the superimposed counts, intermediate means connecting said first means to said second means so they move in a 1:1 correspondence to permit the digital converter to function normally when digital superposition is not required, said intermediate means comprising a differential gear system, means operative on said differential gear system adapted to actuate said means independently of said first means to cause the digit member selected to receive the superimposed counts to be moved a distance equal to one count when digital superposition is required.

3. The invention set forth in claim 2 wherein said first means includes a first gear with an integral coaxial pinion, said second means includes a second gear with an integral coaxial pinion, said differential gear system comprising a planetary spider gear and planetary spider gear locking means to keep the planetary spider gear from rotating when digital superposition is not required, first and second planetary gears rotatably mounted on opposite sides of said planetary spider gear, said first planetary spider gears connected to the integral coaxial pinion of said first gear, said second planetary gears connected to said integral coaxial pinion of said second gear, said gears designed to transmit motion received by said first gear to said second gear in a 1:1 correspondence to permit the digital converter to function normally when superposition is not required.

4. The invention set forth in claim 3 wherein said means operative on said differential gear system adapted to actuate said second means independently of said first means when digital superposition is not required comprises driving means adapted to rotate said planetary spider gear, means connecting said driving means to said planetary spider gear locking means in such a way that actuation of said driving means unlocks and rotates said planetary spider gear causing said second gear to move independently of said first gear when digital superposition is required.

5. The invention set forth in claim 4 wherein said planetary spider gear locking means comprises a spring actuated detent engaging detent of the planetary spider gear, said means connecting the driving means to the planetary spider gear locking means including a support bar, said detent mounted on the support bar, at least one spring actuated pawl pivotally connected to said support bar, a dog connected to said driving means, said pawl biased into engagement with said dog whereby actuation of said driving means acting through the pawl and dog, causes the support bar to move until the detent is moved from engagement with the planetary spider gear teeth, said driving means then rotating the planetary spider gear sufficiently far to cause said second gear to add or subtract one count to the digit member selected to receive the superimposed counts.

References Cited in the file of this patent

UNITED STATES PATENTS 1,011,156 Chase ---------------- Dec. 12, 1911